(12) United States Patent
Lee et al.

(10) Patent No.: US 12,431,518 B2
(45) Date of Patent: Sep. 30, 2025

(54) FUEL CELL SYSTEM AND CONTROL METHOD THEREOF

(71) Applicants: Hyundai Motor Company, Seoul (KR); Kia Corporation, Seoul (KR)

(72) Inventors: Jae Hyung Lee, Yongin-si (KR); Woo Young Lee, Yongin-si (KR); Boung Ho Min, Yongin-si (KR); Dong Hun Lee, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 485 days.

(21) Appl. No.: 18/074,772

(22) Filed: Dec. 5, 2022

(65) Prior Publication Data
US 2024/0030470 A1    Jan. 25, 2024

(30) Foreign Application Priority Data
Jul. 19, 2022    (KR) .................. 10-2022-0089093

(51) Int. Cl.
*H01M 8/04858* (2016.01)
*H01M 8/04537* (2016.01)

(52) U.S. Cl.
CPC ....... *H01M 8/0488* (2013.01); *H01M 8/0494* (2013.01)

(58) Field of Classification Search
CPC .............. H01M 8/0488; H01M 8/0494; H01M 2250/20; H01M 8/04888; H01M 8/04567; H01M 8/04992; H01M 8/04626; Y02E 60/50; B60L 58/30; H02M 3/155; H02M 3/156

USPC .......................................................... 429/428
See application file for complete search history.

(56) References Cited

U.S. PATENT DOCUMENTS

| | | | |
|---|---|---|---|
| 2008/0138680 A1* | 6/2008 | Hu ..................... | H01M 8/04947 429/432 |
| 2009/0261657 A1* | 10/2009 | Chen ................. | H01M 8/04567 320/101 |
| 2018/0304766 A1* | 10/2018 | Kakeno ..................... | B60L 7/18 |
| 2020/0055422 A1* | 2/2020 | Lee .......................... | B60L 1/006 |
| 2020/0168929 A1* | 5/2020 | Tanaka ............... | H01M 8/04611 |
| 2020/0227761 A1* | 7/2020 | Yoshida .................. | B60L 58/20 |
| 2023/0163332 A1* | 5/2023 | Sung ....................... | B60L 58/13 429/9 |

FOREIGN PATENT DOCUMENTS

KR    10-2018-0117979 A    10/2018

* cited by examiner

*Primary Examiner* — Christian Roldan
(74) *Attorney, Agent, or Firm* — Morgan, Lewis & Bockius LLP

(57) ABSTRACT

A fuel cell system includes a fuel cell connected to a main bus through a converter, an auxiliary power supply connected in parallel to the main bus at an output side of the converter, and a controller electrically connected to the converter and configured to control the converter to adjust output of the fuel cell by changing a target input voltage of the converter, configured to increase the target input voltage of the converter when an output voltage of the converter is a set maximum value or more than the set maximum value, and configured to decrease the target input voltage of the converter when the output voltage of the converter is a set minimum value or less the set minimum value. Furthermore, a method of controlling the fuel cell system is disclosed.

20 Claims, 3 Drawing Sheets

FUEL CELL SYSTEM AND CONTROL METHOD THEREOF

CROSS REFERENCE TO RELATED APPLICATION

The present application claims priority to Korean Patent Application No. 10-2022-0089093, filed on Jul. 19, 2022, the entire contents of which is incorporated herein for all purposes by this reference.

BACKGROUND OF THE PRESENT DISCLOSURE

Field of the Present Disclosure

The present disclosure relates to a fuel cell system which is controlled to be able to stably generate power when an auxiliary power supply having relatively low energy density such as a supercap is applied, and a method of controlling the fuel cell system.

Description of Related Art

A fuel cell, which is a device which is supplied with hydrogen and air from the outside thereof and generates electrical energy using an electrochemical reaction in a fuel cell stack, may be used as a power source in various fields such as a fuel cell electric vehicle (FCEV), a fuel cell for power generation, etc.

A fuel cell system includes a fuel cell stack formed by stacking fuel cells that are used as power sources, a fuel supply system supplying hydrogen, etc. that are fuel to the fuel cell stack, an air supply system supplying oxygen which is an oxidizer required for an electrochemical reaction, a water and heat management system controlling the temperature of the fuel cell stack, etc.

The fuel supply system depressurizes and supplies compressed hydrogen in a hydrogen tank to an anode of the fuel cell stack and the air supply system supplies external air drawn by operating an air compressor to a cathode of the fuel cell stack.

When hydrogen is supplied to the anode of the fuel cell stack and oxygen is supplied to the cathode of the fuel cell stack, hydrogen ions are separated through catalysis at the anode. The separated hydrogen ions are transmitted to an oxidizing electrode which is the cathode through an electrolyte membrane, and the hydrogen ions separated from the anode, electrons, and oxygen generate an electrochemical reaction at the oxidizing electrode, whereby electrical energy may be obtained. In detail, electrochemical oxidation of hydrogen occurs at the anode, electrochemical reduction of oxygen occurs at the cathode, electricity and heat are generated due to movement of electrons generated in the present process, and vapor or water is produced by chemical action of bonding of hydrogen and oxygen.

A discharger is provided to discharge hydrogen, oxygen, etc. That do not react with byproducts such as vapor, water, and heat that are produced in the electrical energy generation process of a fuel cell stack, and gases such as vapor, hydrogen, and oxygen are discharged to the atmosphere through an exhaust channel.

Equations of electrochemical reactions that occur in a fuel cell are as follows.

$$2H_2(g) \rightarrow 4H^+(aq.) + 4e^- \quad \text{[Reaction at anode]}$$

$$O_2(g) + 4H^+(aq.) + 4e^- \rightarrow 2H_2O(l) \quad \text{[Reaction at cathode]}$$

$$2H_2(g) + O_2(g) \rightarrow 2H_2O(l) + \text{electrical energy} + \text{thermal energy} \quad \text{[Entire reaction]}$$

As shown in the equations, a hydrogen molecule is decomposed at the anode, so four hydrogen ions and four electrons are produced. The electrons move through an external circuit, so an electric current (electrical energy) is generated, and the hydrogen ions move to the cathode through an electrolyte membrane and generate a cathode reaction. Furthermore, water and heat are produced as byproducts of the electrochemical reactions.

Recently, attempts to replace the existing internal combustion engine with a fuel cell system are being conducted in various applications such as a vehicle, a ship, a power generator, etc.

A fuel cell system, which is a system that supplies required output by generating power when there is request power from a load, unlike a battery system, is characterized in that it has to be supplied with energy from a special external energy source to start power generation. Accordingly, a fuel cell system is not used as a single energy source and is generally used in a hybrid type of a fuel cell system and an auxiliary power supply system in specific applications.

However, a fuel cell system and an auxiliary power supply system are configured in a simple parallel type, it is impossible to control the output of the fuel cell system and control an upper voltage limit for improving durability. Accordingly, a special power conversion system (converter) is applied to control the output of a fuel cell system and an upper voltage limit, and a power net configuration, in which a power conversion system (converter) is applied at the rear end portion of a fuel cell system to achieve an additional advantage that it is possible to forcibly limit output which is supplied from the fuel cell system, is generally used.

The methods of controlling a power conversion system (converter) of the related art have the advantage that they may be commonly applied regardless of the kinds of auxiliary power supplies. However, there are following limitations in applications to which an auxiliary power supply having relatively low energy density such as a supercap is applied.

Active control is difficult when an overvoltage malfunction situation is generated in the output voltage of a converter. A converter controls the output of a fuel cell system by controlling an input voltage, and when an overvoltage problem is generated in the output voltage of the converter, the converter simply stops operating, so a current from the fuel cell system is suddenly cut, whereby there may be a problem that output is not supplied well to a load in the present situation.

Active control is difficult in a situation having the possibility of a voltage overlap malfunction due to a low output voltage of a converter. When controlling an input voltage, a converter simply stops operating when a voltage difference between the input voltage and an output voltage is small within a specific value or is inversed. In the present situation, the input voltage and the output voltage have the same potential and there is a problem that the durability of a fuel cell system may deteriorate and the converter may be individually permanently damaged.

Available operation capacity of a supercap is limited due to large oscillation of the output voltage of a converter. When a supercap is applied as an auxiliary power supply, the output voltage of a converter greatly oscillates in comparison to when a lithium ion battery is applied, and it is impossible to maintain the charge amount of the supercap at a high level in order not to exceed the maximum output voltage of the converter when operating an application. This is because when a supercap is used as an auxiliary power supply, voltage variation by the same charge amount is large in comparison to a lithium ion battery, so an application has to be operated in consideration of a larger margin from a charge maximum value.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell system that can prevent instantaneous disconnection of output of the fuel cell system and can operate a supercap with maximum capacity by derating output of the fuel cell system according to steps when an output voltage is excessive, that can maximize an output assist time of an auxiliary power supply by operating a supercap with maximum capacity, that can prevent voltage overlap of a fuel cell and a battery, deterioration of the durability of the fuel cell system, and permanent damage of a power conversion system through minimum duty control of a converter, and that can reduce a material cost by designing the capacity of an auxiliary power supply smaller than that Generally, and a method of controlling the fuel cell system.

A fuel cell system according to an exemplary embodiment of the present disclosure for achieving the objectives includes: a fuel cell connected to a main bus through a converter; an auxiliary power supply connected in parallel to the main bus at an output side of the converter; and a controller electrically connected to the converter and configured to control the converter to adjust output of the fuel cell by changing a target input voltage of the converter, configured to increase the target input voltage of the converter when an output voltage of the converter is a set maximum value or more than the set maximum value, and configured to decrease the target input voltage of the converter when the output voltage of the converter is a set minimum value or less the set minimum value.

The controller may set the target input voltage of the converter in accordance with request output of a load connected to the main bus when the output voltage of the converter is between the set minimum value and the set maximum value.

The controller may be configured to control an input voltage of the converter to follow the target input voltage by changing a duty ratio of a switching device included in the converter.

The auxiliary power supply may be a super capacitor.

When the output voltage of the converter is the set maximum value or more than the set maximum value, the controller may be configured to determine a difference value between the output voltage of the converter and the set maximum value, and may increase the target input voltage of the converter in accordance with the difference value.

When the output voltage of the converter is the set maximum value or more than the set maximum value, the controller may be configured to determine a difference value between the output voltage of the converter and the set maximum value, may determine a compensation voltage in accordance with the difference value, and may determine the target input voltage by adding the compensation voltage to an input voltage of the converter.

The larger the difference, the more the compensation voltage may be increased.

When the output voltage of the converter is the set minimum value or less than the set minimum value and an input voltage thereof is greater than a value obtained by dividing the output voltage by a minimum voltage transmission ratio of the converter, the controller may decrease the target input voltage of the converter.

When the output voltage of the converter is the set minimum value or less than the set minimum value and an input voltage thereof is greater than a value obtained by dividing the output voltage by a minimum voltage transmission ratio of the converter, the controller may set the target input voltage as the value obtained by dividing the output voltage of the converter by the minimum voltage transmission ratio.

When the output voltage of the converter is the set minimum value or less than the set minimum value and the target input voltage is greater than a value obtained by dividing the output voltage by a minimum voltage transmission ratio of the converter, the controller may decrease the target input voltage of the converter.

When the output voltage of the converter is the set minimum value or less than the set minimum value and the target input voltage is greater than a value obtained by dividing the output voltage by a minimum voltage transmission ratio of the converter, the controller may reset the target input voltage as the value obtained by dividing the output voltage of the converter by the minimum voltage transmission ratio.

The minimum voltage transmission ratio may be a voltage transmission ratio of the converter which is obtained when the converter is controlled at a minimum duty ratio.

A method of controlling a fuel cell system of the present disclosure is a method of controlling a fuel cell system including a fuel cell connected to a main bus through a converter and an auxiliary power supply connected in parallel to an output side of the converter, and includes: changing a target input voltage of the converter in accordance with request output of a load by a controller when an output voltage of the converter is between a set minimum value and a set maximum value; increasing the target input voltage of the converter when the output voltage of the converter is the set maximum value or more than the set maximum value; and decreasing the target input voltage of the converter when the output voltage of the converter is the set minimum value or less than the set minimum value.

In the increasing of the target input voltage, when the output voltage of the converter is the set maximum value or more than the set maximum value, the controller may be configured to determine a difference value between the output voltage of the converter and the set maximum value, may determine a compensation voltage in accordance with the difference value, and may derive the target input voltage by adding the compensation voltage to an input voltage of the converter.

In the decreasing of the target input voltage, when the output voltage of the converter is the set minimum value or less than the set minimum value and an input voltage thereof is greater than a value obtained by dividing the output voltage by a minimum voltage transmission ratio of the converter, the controller may set the target input voltage as the value obtained by dividing the output voltage of the converter by the minimum voltage transmission ratio.

The method may further include controlling an input voltage of the converter to follow the target input voltage by changing a duty ratio of a switching device included in the converter by the controller.

According to the fuel cell system and the method of controlling the fuel cell system of the present disclosure, it is possible to prevent instantaneous disconnection of output of the fuel cell system and operate a supercap with maximum capacity by derating output of the fuel cell system according to steps when an output voltage is excessive, it is possible to maximize an output assist time of an auxiliary power supply by operating a supercap with maximum capacity, it is possible to prevent voltage overlap of a fuel cell and a battery, deterioration of the durability of the fuel cell system, and permanent damage of a power conversion system through minimum duty control of a converter, and it is possible to reduce a material cost by designing the capacity of an auxiliary power supply smaller than that in the related art.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
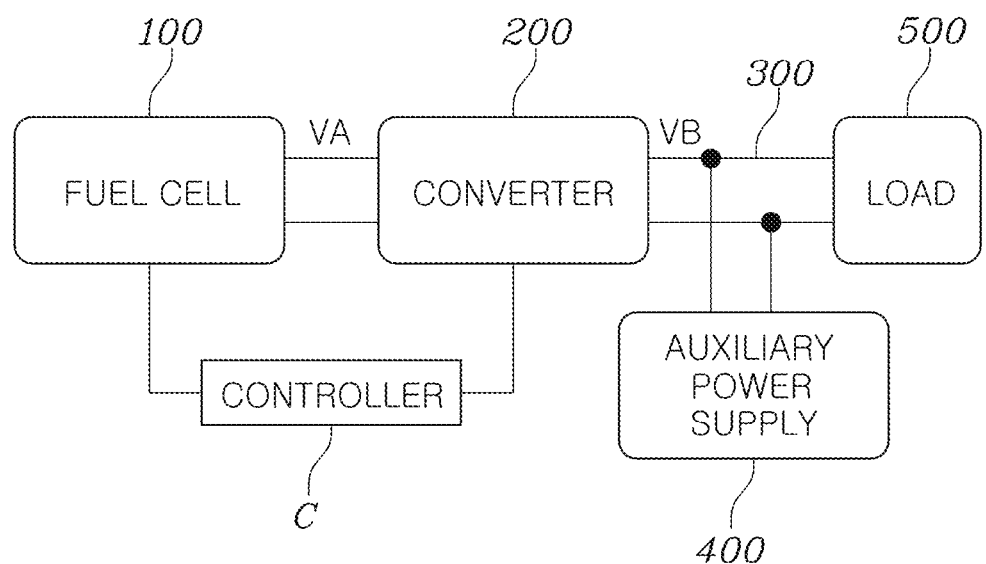
FIG. 1 is a diagram showing the configuration of a fuel cell system according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, embodiments of the present disclosure will be described in detail with reference to the accompanying drawings and the same or similar components are provided the same reference numerals regardless of the numbers of figures and are not repeatedly described.

In the following description, if it is decided that the detailed description of known technologies related to the present disclosure makes the subject matter of the exemplary embodiments described herein unclear, the detailed description is omitted. Furthermore, the accompanying drawings are provided only for easy understanding of embodiments included in the specification, the technical spirit included in the specification is not limited by the accompanying drawings, and all changes, equivalents, and replacements may be understood as being included in the spirit and scope of the present disclosure.

Terms including ordinal numbers such as "first", "second", etc., may be used to describe various components, but the components are not to be construed as being limited to the terms. The terms are used only to distinguish one component from another component.

Singular forms are intended to include plural forms unless the context clearly indicates otherwise.

It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Terms "module" and "unit" that are used for components in the following description are used only for the convenience of description without having discriminate meanings or functions.

It is to be understood that when one element is referred to as being "connected to" or "coupled to" another element, it may be directly connected to or directly coupled to another element or be connected to or coupled to another element, having the other element intervening therebetween. On the other hand, it should be understood that when one element is referred to as being "directly connected to" or "directly coupled to" another element, it may be connected to or coupled to another element without the other element intervening therebetween.

A controller may include a communication device that communicates with another controller or a sensor to control corresponding functions, a memory that stores an operating system or logic commands and input/output information, and one or more processors that perform determination, calculation, decision, etc. For controlling the corresponding functions.

Figure 2:
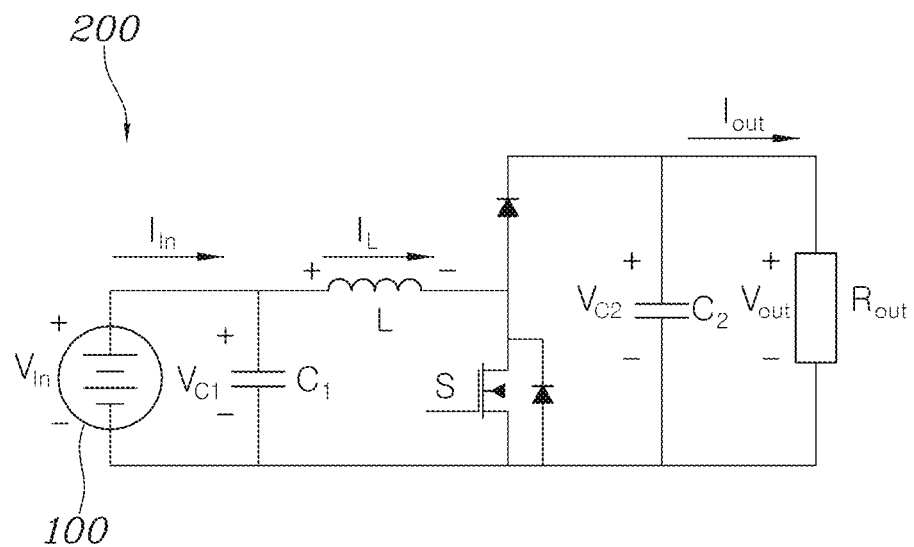
FIG. 2 is a diagram showing the configuration of a converter in the fuel cell system according to various exemplary embodiments of the present disclosure.
Figure 3:
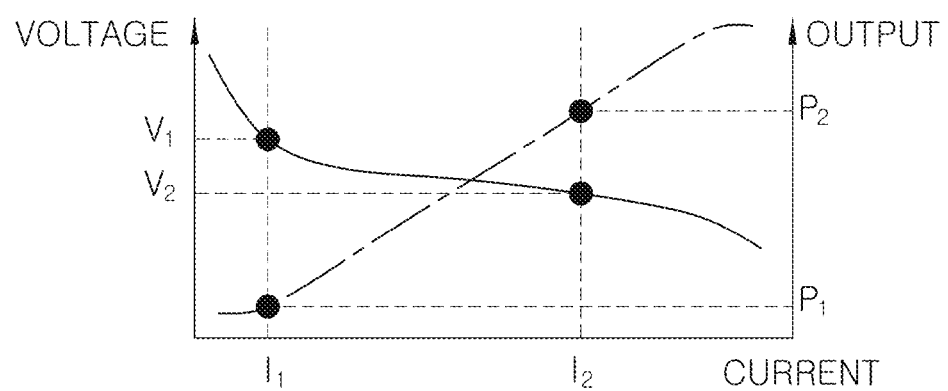
FIG. 3 is a graph showing fuel cell output in the fuel cell system according to various exemplary embodiments of the present disclosure.
Figure 4:
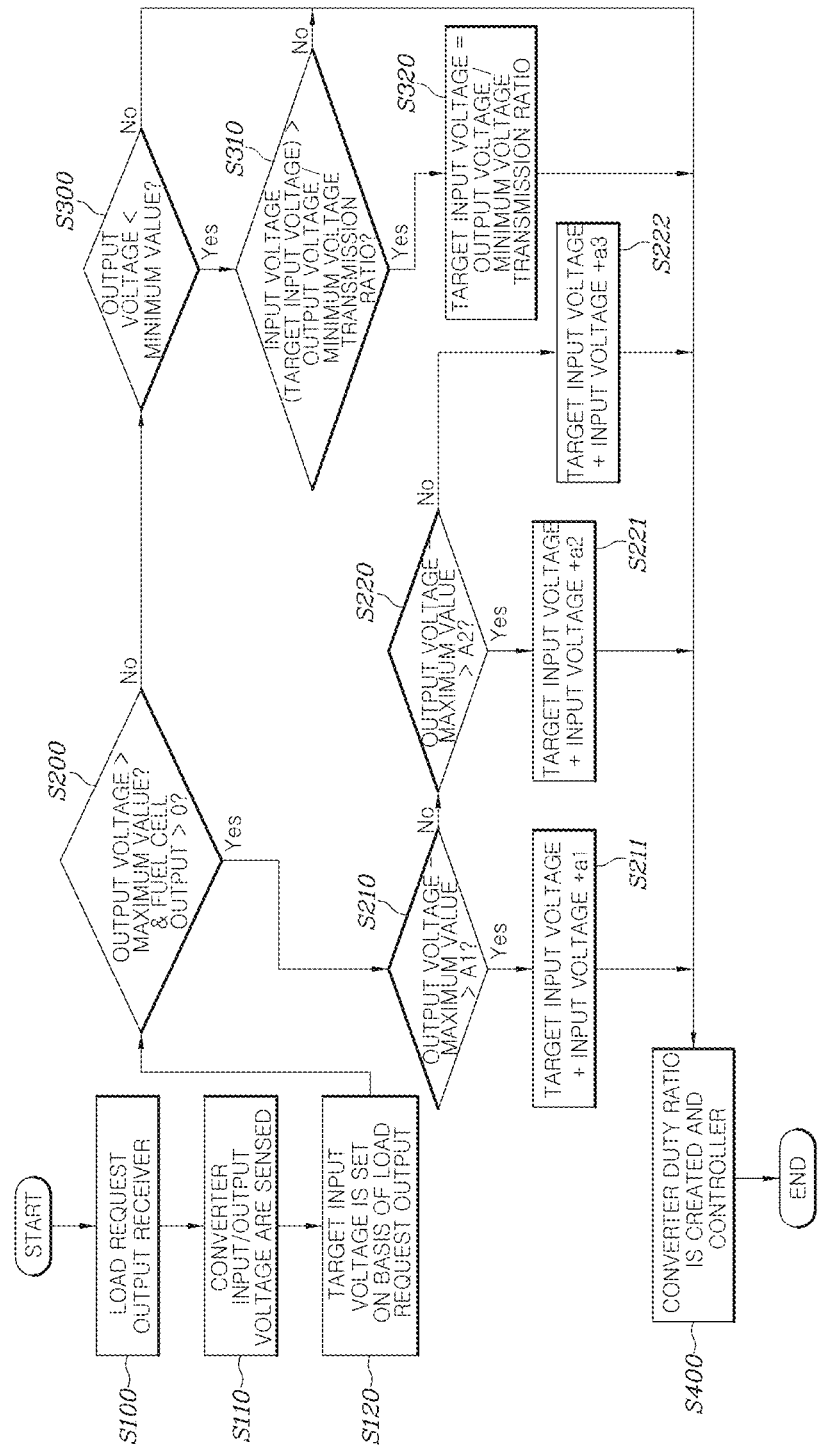
FIG. 4 is a flowchart of a method of controlling a fuel cell system according to various exemplary embodiments of the present disclosure.

FIG. 1 is a diagram showing the configuration of a fuel cell system according to various exemplary embodiments of the present disclosure, FIG. 2 is a diagram showing the configuration of a converter in the fuel cell system according to various exemplary embodiments of the present disclosure, FIG. 3 is a graph showing fuel cell output in the fuel cell system according to various exemplary embodiments of the present disclosure, and FIG. 4 is a flowchart of a method of controlling a fuel cell system according to various exemplary embodiments of the present disclosure.

FIG. 1 is a diagram showing the configuration of a fuel cell system according to various exemplary embodiments of the present disclosure and the fuel cell system according to various exemplary embodiments of the present disclosure may include a fuel cell 100 connected to a main bus through a converter 200; an auxiliary power supply 400 connected in parallel to the main bus 300 at an output side of the converter 200; and a controller C controlling the converter 200 to adjust output of the fuel cell 100 by changing a target input voltage of the converter 200, increasing the target input voltage of the converter 200 when an output voltage of the converter 200 is a set maximum value or more than the set maximum value, and decreasing the target input voltage of the converter 200 when the output voltage of the converter 200 is a set minimum value or less the set minimum value.

According to the fuel cell system of the present disclosure, the fuel cell 100 which is supplied with hydrogen and air and generates power is a power conversion system and is connected to the main bus 300 through the converter 200. The configuration of the converter 200 is shown in FIG. 2 and the controller C is configured to control output of the fuel cell 100 by controlling an input voltage of the converter 200.

The auxiliary power supply 400 is connected in parallel to the main bus 300, assisting output of the fuel cell 100. A battery or a supercap (super capacitor) or another fuel cell may be used as the auxiliary power supply 400. A load 500 is connected to the main bus 300. A power consumption source such as an inverter and a driving motor or an air compressor may be used as the load 500.

A supercap may be a representative example of the auxiliary power supply 400. A supercap has a characteristic that energy density is low but output density is high in comparison to a lithium ion battery, has an advantage in terms of weight/volume when an auxiliary power supply system is configured under the condition of the same output amount, and has an advantage that instantaneous output performance is improved and accordingly accelerating passing performance under the condition of the same weight/volume. A supercap is also capable of energy required to start a fuel cell system.

When an output voltage VB of the converter 200 is between the set minimum value and the set maximum value, the controller C can set the target input voltage of the converter 200 in accordance with request output of the load connected to the main bus 300. That is, the output voltage VB of the converter 200 of the fuel cell system is applied to the load, and when the output voltage VB of the converter 200 is stably maintained at preset minimum value and maximum value, it is determined as a normal situation that does not require specific control, and the target input voltage of the converter 200 is set in accordance with request output of the load 500 connected to the main bus 300.

Accordingly, the controller C can control an input voltage VA of the converter to follow the target input voltage by changing a duty ratio of a switching device S included in the converter 200.

FIG. 2 is a diagram showing the configuration of a converter in the fuel cell system according to various exemplary embodiments of the present disclosure and FIG. 3 is a graph showing fuel cell output in the fuel cell system according to various exemplary embodiments of the present disclosure.

The main purpose of a power conversion system (converter) is to control the output amount of a fuel cell. A converter is configured to control a voltage at a fuel cell and adjusts the amount of output of the fuel cell that goes to a load. For example, when a request output amount of a load increases from P1 to P2, a converter decreases a target voltage of an input voltage from V1 to V2 and increases a current from I1 to I2, whereby the output amount from a fuel cell is increased and supplied to the load. In contrast, when a request output amount of a load decreases, a converter increases the target voltage of an input voltage, decreasing an output amount from a fuel cell.

The converter 200 may be configured as shown in FIG. 2, and the exemplary embodiment shown in the figure shows an example of a DC boost converter. In the instant case, the controller can change the input voltage of the converter connected to the fuel cell by changing the duty ratio of the switching device S included in the converter 200. As a result, the converter changes an output voltage in the fuel cell's place, adjusting output of the fuel cell. The controller changes the target input voltage of the converter in accordance with request output of the load, and when necessary, can increase or decrease the target input voltage, whereby the output of the fuel cell is controlled.

When the output voltage VB of the converter 200 is a set maximum value or more than the set maximum value, the controller C can determine the difference value between the output voltage VB of the converter 200 and the maximum value and can increase the target input voltage of the converter 200 in accordance with the difference value. In detail, when the output voltage VB of the converter 200 is a set maximum value or more than the set maximum value, the controller C can determine the difference value between the output voltage VB of the converter 200 and the maximum value, can determine a compensate voltage in accordance with the difference value, and can derive a target input voltage by adding the compensation voltage to the input voltage VA of the converter 200. The larger the difference value, the more the compensation voltage may be increased.

The present disclosure can determine whether to derate fuel cell output by the converter itself and can perform derating. When the output voltage of a converter is an overvoltage and the overvoltage situation is attenuated by stopping operation of the converter, the output of a fuel cell system is instantaneously cut and supply for a request output amount of a load may not be performed well.

Accordingly, the purpose of derating control of fuel cell output is to control the output of a fuel cell system to attenuate an overvoltage situation without instantaneously cutting output of the fuel cell system when an overvoltage situation occurs. To the present end, when a voltage at the level of a maximum output voltage of a converter is generated, whether to derate fuel cell output by the converter itself is determined in accordance with the output amount of the fuel cell. Furthermore, when fuel cell output is derated by the converter itself, a slew-rate is determined and the output of the fuel cell is controlled in accordance with the difference between the output voltage of the converter and the maximum output voltage.

For reference, the maximum output voltage of a converter at an application level may be selected using an output voltage and a minimum value of a maximum voltage of a converter output terminal sharing the same node, a maximum voltage at an inverter input side, or a maximum voltage of an auxiliary power supply.

A converter that is configured to control output of a fuel cell system determines a target input voltage in accordance with a request output amount of a load. In a general situation, a controller is configured to determine a duty ratio of a switching device of the converter to be configured to follow the target input voltage determined in accordance with the request of the load.

However, when an output voltage of the converter increases higher than a preset maximum value at an application level, derating control of fuel cell output is performed.

This is because when output of the fuel cell system goes to the load under an overvoltage situation, a single portion at a corresponding node may be burned. Accordingly, the purpose of derating control of fuel cell output is to control the output of a fuel cell system to attenuate an overvoltage situation without instantaneously cutting output of the fuel cell system when an overvoltage situation occurs.

To derate an output amount of a fuel cell system, a duty ratio of a converter should be determined by setting a new target input voltage value as a value greater than the current input voltage of the converter while disregarding a target input voltage value determined first in accordance with a request output amount of a load.

target input voltage=input voltage+a

To attenuate an overvoltage situation and decrease variation of output of a fuel cell system which is transmitted to a load, the value 'a' which is added to an input voltage thereof is changed in accordance with the voltage difference between the current output voltage of a converter and a maximum value. The smaller the capacity of an auxiliary power supply, the more the derating control of fuel cell output is complicated, so a load can be stably driven only when oscillation of an input voltage thereof is minimized.

Meanwhile, when the output voltage VB of the converter 200 is a set minimum value or less the set minimum value and the input voltage VA is greater than a value obtained by dividing the output voltage VB by a minimum voltage transmission ratio of the converter 200, the controller C can decrease the target input voltage of the converter 200. In detail, when the output voltage VB of the converter 200 is a set minimum value or less the set minimum value and the input voltage VA is greater than a value obtained by dividing the output voltage VB by a minimum voltage transmission ratio of the converter, the controller C can set the target input voltage as the value obtained by dividing the output voltage VB of the converter 200 by the minimum voltage transmission ratio.

Furthermore, when the output voltage VB of the converter 200 is a set minimum value or less the set minimum value and the target input voltage is greater than a value obtained by dividing the output voltage VB by the minimum voltage transmission ratio of the converter, the controller C can decrease the target input voltage of the converter 200. In detail, when the output voltage VB of the converter 200 is a set minimum value or less the set minimum value and the target input voltage is greater than a value obtained by dividing the output voltage VB by a minimum voltage transmission ratio of the converter, the controller C can reset the target input voltage as the value obtained by dividing the output voltage VB of the converter 200 by the minimum voltage transmission ratio.

The minimum voltage transmission ratio may be a voltage transmission ratio of the converter which is obtained when the converter is controlled at a minimum duty ratio.

The present disclosure can determine whether to perform minimum duty ratio control by a converter itself and can perform minimum duty ratio control. In general, it is practically impossible to control a switching device of a converter at a minimum duty ratio or less, so a converter may not operate when the voltage difference between an input voltage and an output voltage of the converter is very small. Accordingly, when a converter may not operate because the voltage difference between an input voltage and an output voltage of the converter is small, the voltage of a fuel cell system increases, and as a result, parts may be damaged due to voltage overlap.

To the present end, the purpose of performing minimum duty control is to control a converter not to come in the state, in which the converter cannot operate because the voltage difference between an input voltage and an output voltage of the converter is small, and to come out of the situation.

Accordingly, when there is a possibility of voltage inversion because an output voltage of a converter is less than a preset minimum value, whether to perform minimum duty control is determined in consideration of the voltage difference between an input voltage or a target input voltage and the output voltage. In the instant case, it is possible to compare the input voltage and the output voltage with each other, it is also possible to compare the target input voltage and the output voltage with each other, and it is also possible to compare both the input voltage and the target input voltage with the output voltage and perform minimum duty control.

It is possible to maintain the voltage difference between the input voltage and the output voltage over a predetermined value by decreasing the target input voltage also even when the output voltage of the converter is decreased by minimum duty control.

Minimizing overlap of voltages of a fuel cell system and an auxiliary power supply is considered in the step of designing a high-voltage part of an application. However, when the charge amount of an auxiliary power supply is not appropriately managed or a voltage drop according to output increases due to an increase of internal parasitic resistance in winter time, a voltage difference may be unexpectedly decreased between a fuel cell and an auxiliary power supply and an output voltage of a converter at which such unexpected reduction of a voltage difference may be generated is defined into a minimum value in advance.

When an output voltage of a converter is lower than a minimum value, whether to perform minimum duty control is determined based on a minimum voltage transmission ratio which is a voltage transmission ratio when the converter is controlled at a minimum duty ratio.

Input voltage (or target input voltage)>output voltage/minimum voltage transmission ratio When the present condition is satisfied, the voltage difference between a fuel cell system and an auxiliary power supply is small or voltage overlap may be caused by a small voltage difference, so whether to perform minimum duty control is determined using a corresponding reference.

When it is determined to perform minimum duty control, a new target input voltage is determined as follows using a current low output voltage of a converter and a minimum duty ratio while disregarding the previous target input voltage value determined in accordance with a request output amount of a load, and the converter is controlled.

Target input voltage=output voltage/minimum voltage transmission ratio

Such minimum duty control makes it possible to avoid voltage overlap of a fuel cell system and an auxiliary power supply and makes it possible to come out of a corresponding situation by increasing the voltage of the auxiliary power supply by charging the auxiliary power supply regardless of request power of a load.

FIG. 4 is a flowchart of a method of controlling a fuel cell system according to various exemplary embodiments of the present disclosure. The method of controlling a fuel cell system of the present disclosure is a method of controlling a fuel cell system including a fuel cell connected to a main bus through the converter and an auxiliary power supply connected in parallel to an output side of the converter, and includes: changing a target input voltage of the converter in accordance with request output of a load by a controller when an output voltage of the converter is between a set minimum value and a set maximum value (S120); increasing the target input voltage of the converter when the output voltage of the converter is the set maximum value or more (S211, S221, S222); and decreasing the target input voltage of the converter when the output voltage of the converter is the set minimum value or less (S320).

In the increasing of the target input voltage, when the output voltage of the converter is the set maximum value or more than the set maximum value, the controller can determine a difference value between the output voltage of the converter and the set maximum value, determine a compensation voltage in accordance with the difference value, and derive a target input voltage by adding the compensation voltage to an input voltage of the converter.

In the decreasing of the target input voltage, when the output voltage of the converter is the set minimum value or less than the set minimum value and an input voltage thereof is greater than a value obtained by dividing the output voltage by a minimum voltage transmission ratio of the converter, the controller can set the target input voltage of the converter as the value obtained by dividing the output voltage of the converter by the minimum voltage transmission ratio.

The method may further include controlling the input voltage of the converter to follow the target input voltage by changing a duty ratio of a switching device included in the converter by the controller (S400).

According to the method of controlling a fuel cell system according to various exemplary embodiments of the present disclosure, first, the controller is configured to receive request output of the load, power is generated by a fuel cell, and input/output voltages of the converter are detected (S100, S110). A target input voltage of the converter is set based on request output of a load and output of the fuel cell is adjusted by controlling a duty ratio of the switching device so that the input voltage of the converter becomes the target input voltage (S120).

However, when the output voltage of the converter is greater than the maximum value, the target input voltage is compensated in accordance with the difference between the output voltage and the maximum value. The exemplary embodiment shown in the figure shows A1>A2, a1>a2>a3 (S200, S210, S220, S211, S221, S222).

Meanwhile, when the output voltage is smaller than the minimum value and the input voltage is greater than output voltage/minimum voltage transmission ratio, the target input voltage is changed into the value of output voltage/minimum voltage transmission ratio (S300, S310, and S320).

The duty ratio of the switching device of the converter is set and controlled in accordance with the finally set target input voltage (S400).

According to the fuel cell system and the method of controlling the fuel cell system of the present disclosure, it is possible to prevent instantaneous disconnection of output of the fuel cell system and operate a supercap with maximum capacity by derating output of the fuel cell system according to steps when an output voltage is excessive, it is possible to maximize an output assist time of an auxiliary power supply by operating a supercap with maximum capacity, it is possible to prevent voltage overlap of a fuel cell and a battery, deterioration of the durability of the fuel cell system, and permanent damage of a power conversion system through minimum duty control of a converter, and it is possible to reduce a material cost by designing the capacity of an auxiliary power supply smaller than that in the related art.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel cell system comprising:
    a fuel cell connected to a main bus through a converter;
    an auxiliary power supply connected in parallel to the main bus at an output side of the converter; and
    a controller electrically connected to the converter and configured to control the converter to adjust output of the fuel cell by changing a target input voltage of the converter, configured to increase the target input voltage of the converter when an output voltage of the converter is a set maximum value or more than the set maximum value, and configured to decrease the target input voltage of the converter when the output voltage of the converter is a set minimum value or less the set minimum value.

2. The fuel cell system of claim 1, wherein the controller is configured to set the target input voltage of the converter in accordance with request output of a load connected to the main bus when the output voltage of the converter is between the set minimum value and the set maximum value.

3. The fuel cell system of claim 1, wherein the controller is configured to control an input voltage of the converter to follow the target input voltage by changing a duty ratio of a switching device included in the converter.

4. The fuel cell system of claim 1, wherein the auxiliary power supply is a super capacitor.

5. The fuel cell system of claim 1, wherein when the output voltage of the converter is the set maximum value or more than the set maximum value, the controller is configured to determine a difference value between the output voltage of the converter and the set maximum value, and to increase the target input voltage of the converter in accordance with the difference value.

6. The fuel cell system of claim 1, wherein when the output voltage of the converter is the set maximum value or more than the set maximum value, the controller is configured to determine a difference value between the output voltage of the converter and the set maximum value, to determine a compensation voltage in accordance with the difference value, and to derive the target input voltage by adding the compensation voltage to an input voltage of the converter.

7. The fuel cell system of claim 6, wherein the controller is configured so that the larger the difference value, the more the compensation voltage increases.

8. The fuel cell system of claim 1, wherein when the output voltage of the converter is the set minimum value or less than the set minimum value and an input voltage thereof is greater than a value obtained by dividing the output voltage by a minimum voltage transmission ratio of the converter, the controller is configured to decrease the target input voltage of the converter.

9. The fuel cell system of claim 1, wherein when the output voltage of the converter is the set minimum value or less than the set minimum value and an input voltage thereof is greater than a value obtained by dividing the output voltage by a minimum voltage transmission ratio of the converter, the controller is configured to set the target input voltage as the value obtained by dividing the output voltage of the converter by the minimum voltage transmission ratio.

10. The fuel cell system of claim 1, wherein when the output voltage of the converter is the set minimum value or less than the set minimum value and the target input voltage is greater than a value obtained by dividing the output voltage by a minimum voltage transmission ratio of the converter, the controller is configured to decrease the target input voltage of the converter.

11. The fuel cell system of claim 1, wherein when the output voltage of the converter is the set minimum value or less than the set minimum value and the target input voltage is greater than a value obtained by dividing the output voltage by a minimum voltage transmission ratio of the converter, the controller is configured to reset the target input voltage as the value obtained by dividing the output voltage of the converter by the minimum voltage transmission ratio.

12. The fuel cell system of claim 8, wherein the minimum voltage transmission ratio is a voltage transmission ratio of the converter which is obtained when the converter is controlled at a minimum duty ratio.

13. A method of controlling a fuel cell system including a fuel cell connected to a main bus through a converter and an auxiliary power supply connected in parallel to an output side of the converter, the method comprising:
    changing a target input voltage of the converter in accordance with request output of a load by a controller when an output voltage of the converter is between a set minimum value and a set maximum value;
    increasing, by the controller, the target input voltage of the converter when the output voltage of the converter is the set maximum value or more than the set maximum value; and
    decreasing, by the controller, the target input voltage of the converter when the output voltage of the converter is the set minimum value or less than the set minimum value.

14. The method of claim 13, wherein in the increasing of the target input voltage, when the output voltage of the converter is the set maximum value or more than the set maximum value, the controller is configured to determine a difference value between the output voltage of the converter and the set maximum value, to determine a compensation voltage in accordance with the difference value, and to derive the target input voltage by adding the compensation voltage to an input voltage of the converter.

15. The method of claim 13, wherein in the decreasing of the target input voltage, when the output voltage of the converter is the set minimum value or less than the set minimum value and an input voltage thereof is greater than a value obtained by dividing the output voltage by a minimum voltage transmission ratio of the converter, the controller is configured to set the target input voltage as the value obtained by dividing the output voltage of the converter by the minimum voltage transmission ratio.

16. The method of claim 13, further including controlling an input voltage of the converter to follow the target input voltage by changing a duty ratio of a switching device included in the converter by the controller.

17. The method of claim 13, wherein when the output voltage of the converter is the set maximum value or more than the set maximum value, the controller is configured to determine a difference value between the output voltage of the converter and the set maximum value, and to increase the target input voltage of the converter in accordance with the difference value.

18. The method of claim 13, wherein when the output voltage of the converter is the set minimum value or less than the set minimum value and an input voltage thereof is greater than a value obtained by dividing the output voltage by a minimum voltage transmission ratio of the converter, the controller is configured to decrease the target input voltage of the converter.

19. The method of claim 13, wherein when the output voltage of the converter is the set minimum value or less than the set minimum value and the target input voltage is greater than a value obtained by dividing the output voltage by a minimum voltage transmission ratio of the converter, the controller is configured to decrease the target input voltage of the converter.

20. The method of claim 13, wherein when the output voltage of the converter is the set minimum value or less than the set minimum value and the target input voltage is greater than a value obtained by dividing the output voltage by a minimum voltage transmission ratio of the converter, the controller is configured to reset the target input voltage as the value obtained by dividing the output voltage of the converter by the minimum voltage transmission ratio.

* * * * *